US008473754B2

(12) United States Patent
Jones et al.

(10) Patent No.: US 8,473,754 B2
(45) Date of Patent: Jun. 25, 2013

(54) HARDWARE-FACILITATED SECURE SOFTWARE EXECUTION ENVIRONMENT

(75) Inventors: Mark T. Jones, Blacksburg, VA (US); Peter M. Athanas, Newport, VA (US); Cameron D. Patterson, Blacksburg, VA (US); Joshua N. Edmison, Ellicott City, MD (US); Anthony Mahar, Merrimack, NH (US); Benjamin J. Muzal, Fairfax, VA (US); Barry L. Polakowski, Roanoke, VA (US); Jonathan P. Graf, Blacksburg, VA (US)

(73) Assignees: Virginia Tech Intellectual Properties, Inc., Blacksburg, VA (US); Macaulay-Brown, Inc., Dayton, OH (US)

( * ) Notice: Subject to any disclaimer, the term of this patent is extended or adjusted under 35 U.S.C. 154(b) by 1970 days.

(21) Appl. No.: 11/707,951

(22) Filed: Feb. 20, 2007

(65) Prior Publication Data

US 2010/0122095 A1    May 13, 2010

Related U.S. Application Data

(60) Provisional application No. 60/775,336, filed on Feb. 22, 2006.

(51) Int. Cl.
  G06F 11/30  (2006.01)
  H04L 9/32   (2006.01)
  H04L 9/00   (2006.01)
  H04K 1/00   (2006.01)

(52) U.S. Cl.
  USPC .............. 713/190; 713/171; 380/28; 380/277

(58) Field of Classification Search
  USPC .............................. 713/171, 190; 380/28, 277
  See application file for complete search history.

(56) References Cited

U.S. PATENT DOCUMENTS 5,987,572 A    11/1999  Weidner et al.
7,003,116 B2 *  2/2006  Riedel et al. .................. 380/277
(Continued)

OTHER PUBLICATIONS

Athanas et al. "Hardware and Software Black Boxes: Preliminary Results for the Secure Sofware Platform", Technical report, Luna Innovations, Inc., presented at the ERSA conference in Las Vegas, (Jun. 2005).

(Continued)

Primary Examiner — Mohammad W Reza
(74) Attorney, Agent, or Firm — Nixon & Vanderhye P.C.

(57) ABSTRACT

A hardware-facilitated secure software execution environment provides protection of both program instructions and data against unauthorized access and/or execution to maintain confidentiality and integrity of the software or the data during distribution, in external memories, and during execution. The secure computing environment is achieved by using a hardware-based security method and apparatus to provide protection against software privacy and tampering. A Harvard architecture CPU core is instantiated on the same silicon chip along with encryption management unit (EMU) circuitry and secure key management unit (SKU) circuitry. Credential information acquired from one or more sources is combined by the SKU circuitry to generate one or more security keys provided to the EMU for use in decrypting encrypted program instructions and/or data that is obtained from a non-secure, off-chip source such as an external RAM, an information storage device or other network source. In a non-limiting illustrative example implementation, the EMU decrypts a single memory page of encrypted instructions or data per a corresponding encryption key provided by the SKU. Although instantiated on the same chip, the CPU core does not have direct access to the SKU circuitry or to encryption key information generated by the SKU.

64 Claims, 7 Drawing Sheets

U.S. PATENT DOCUMENTS

| | | | | |
|---|---|---|---|---|
| 7,065,215 | B2* | 6/2006 | Shirakawa et al. | 380/277 |
| 7,212,634 | B2* | 5/2007 | Briscoe | 380/203 |
| 2003/0028794 | A1 | 2/2003 | Miller et al. | |
| 2003/0084308 | A1 | 5/2003 | Van Rijnswou | |
| 2003/0133574 | A1 | 7/2003 | Caronni et al. | |
| 2003/0188178 | A1 | 10/2003 | Strongin et al. | |
| 2003/0229482 | A1 | 12/2003 | Cook et al. | |
| 2004/0025040 | A1 | 2/2004 | Aoki et al. | |
| 2004/0039924 | A1 | 2/2004 | Baldwin et al. | |
| 2004/0091114 | A1 | 5/2004 | Carter et al. | |
| 2004/0109563 | A1 | 6/2004 | Evans et al. | |
| 2004/0123122 | A1 | 6/2004 | Asai et al. | |
| 2004/0128458 | A1 | 7/2004 | Buhr | |
| 2004/0228485 | A1* | 11/2004 | Abu et al. | 380/44 |
| 2004/0250066 | A1 | 12/2004 | Di Luoffo et al. | |
| 2006/0015748 | A1* | 1/2006 | Goto et al. | 713/190 |
| 2007/0237325 | A1* | 10/2007 | Gershowitz et al. | 380/30 |
| 2009/0037747 | A1* | 2/2009 | Xie | 713/192 |

OTHER PUBLICATIONS

Alves et al. "TrustZone: Integrated Hardware and Software Security", technical report, ARM, pp. 1-12 (Jul. 2004).

"Designing with TrustZone Hardware Requirements", technical report, ARM pp. 1-10 (Mar. 2006).

Graf "Special Technical Report: The Layered Model of Anti-Tamper Technology", technical report, Luna Innovations, Virginia Tech, pp. 1-12 (Feb. 2006).

Halfhill "ARM Dons Armor—TrustZone Security Extensions Strengthen ARMv6 Architecture", Reed Electornics Group, Microprocessor Report, pp. 1-4 (Aug. 2003).

Khanvilkar "Guaranteeing Memory Integrity in Secure Processors with Dynamic Trees", Advance Computer Architecture, technical report (May 2004).

Lie "Architectural Support for Copy and Tamper-Resistant Software", Dissertation submitted to the Dept. of Electrical Engineering of Stanford University, pp. 1-111 (Dec. 2003).

Lipmaa et al. "Comments to NIST Concerning AES Modes of Operations: CTR-Mode Encryption", technical report, presented at NIST conference, pp. 1-4 (Oct. 2000).

Mahar et al. "Design and Characterization of a Hardware Encryption Management Unit for Secure Computing Platforms", technical report, Virginia Polytechnic Institute and State University, pp. 1-10 (Jan. 2006).

Qin "Hardware Mechanism and their Implementations for Secure Embedded Systems" Master Thesis performed in Computer System Security, Linkoping University, pp. 1-58 (2005).

Sachdev "Development of a Programming Model for the AEGIS Secure Processor", Thesis, Massachusetts Institute of Technology, pp. 1-64 (May 2005).

"Secure Software Development with the TrustZone Software API", technical report, ARM (Oct. 2006).

Suh et al. "AEGIS: Architecture for Tamper-Evident and Tamper-Resistant Processing", technical report, Massachusetts Institute of Techonology, (Jun. 2003).

Suh et al. "Design and Implementation of the AEGIS Single-Chip Secure Processor Using Physical Random Functions" Proceedings of the $32^{nd}$ International Symposium on Computer Architecture (ISCA '05) IEEE, pp. 1-12 (2005).

Suh "AEGIS: A Single-Chip Secure Processor" Thesis, Massachusetts Institute of Techonology, pp. 1-240 (Sep. 2005).

"TrustZone API Overview" ARM, http://www.arm.com/products/esd/trustzone_apioverview.html.

"TrustZone Technology Overview" ARM, Secure Extensions to the ARM Architecture, http://www.arm.com/products/esd/trustzone_home.html.

"TrustZone System Design", ARM, http://www.arm.com/products/esd/trustzone_systemdesign.html.

Vaslin et al. "Secure Architecture in Embedded Systems: An Overview—presented at Cryptarchi", Lester UBS/CNRS FRE 2734 (Jun. 2006).

Yang et al. "Improving Memory Encryption Performance in Secure Processors", IEEE Transactions on Computers 54:630-640 (May 2005).

Yang et al. "Fast Secure Processor for Inhibiting Software Piracy and Tampering" Proceedings of the $36^{th}$ International Symposium on Microarchitecture IEEE (2003).

Zhang et al. "Hardware Supported Anomaly Detection: Down to the Control Flow Level", Georgia Institute of Technology, technical report, pp. 1-11 (Mar. 2004).

* cited by examiner

HARDWARE-FACILITATED SECURE SOFTWARE EXECUTION ENVIRONMENT

CROSS-REFERENCES TO RELATED APPLICATIONS

This application claims the benefit of provisional application 60/775,336 filed Feb. 22, 2006, incorporated herein by reference.

STATEMENT REGARDING FEDERALLY SPONSORED RESEARCH OR DEVELOPMENT

The disclosed material was based at least in part on work supported by the United States Air Force under contract number FA8650-04-C-8005.

FIELD

The technological field relates to software privacy and anti-tamper protection. More particularly, the exemplary illustrative non-limiting technology disclosed herein relates to a hardware-based security apparatus and method for providing a secure software execution environment and for protecting software applications and data from unauthorized access and execution.

BACKGROUND AND SUMMARY

Since the beginning of digital computing, software security has been important to software vendors and users. Computers are commonly used to perform operations on sensitive data where the data itself and the computational instructions must be safe-guarded. Early computing devices operating on sensitive information were physically isolated, to protect the data. However, as computing devices became more pervasive and interconnected, the need for secure computing in non-secure locations by non-trusted users became necessary.

Effective software protection must address at least two threats to software applications: software integrity and confidentiality. Together, these comprise anti-tamper protections. Software integrity attacks try to modify program instructions. Maintaining software integrity ensures that secure software runs the way developers programmed it to. Software integrity also ensures that the user can trust that the program has not been altered beyond the developer's creation and that threats from viruses and malicious users that rely on code modification are minimized or eliminated. Secure architectures provide confidentiality; in contrast, trusted architectures generally do not. Software confidentiality offers protection from threats such as unauthorized or unlicensed copying of programs including piracy and the reverse engineering of algorithms. Software confidentiality is also employed to protect intellectual property and avoid unwanted disclosure to the public, competitors and/or potentially malicious entities. Likewise, these same principles of integrity and confidentiality also apply similarly to raw data that is stored, maintained or used by computer systems.

There is an increasing demand for software protection in modern computing systems. Contemporary software protection often requires maintaining confidentiality and integrity of software during distribution, in external memories, and during execution. Although various approaches attempt to provide both tamper resistance and confidentiality for software, these approaches typically assume that certain software operations will function, or they require fundamental changes to the way an operating system and applications interact. For example, the inherited trust model used by many conventional computing environment security systems is an unsatisfactory security solution. Indeed, if a trusted module is compromised, the rest of the system trusting that module can no longer guarantee protection. Such problems are further compounded by the lack of confidentiality. Other conventional computing environment security arrangements that rely less on trusted software components typically require fundamental changes to the way the application software operates and/or how the processor and operating system interact with the software. Such security arrangements may provide software protection, but due to the fundamental changes and incompatibilities with contemporary software models they are not easily incorporated into many computer systems.

FIG. 1 diagrammatically illustrates the problem of software vulnerabilities and threats that typically exist in a conventional unprotected computing environment. Several different types of attacks may be staged against an unprotected computing environment that can compromise the confidentiality and/or integrity of a user's software applications and/or data. For example, an attack on a user's proprietary software and/or data 10 might be perpetrated by a malicious software process 20 that is stored in an external unprotected memory. Alternatively, an attack might be also staged during the distribution of proprietary software/data or through execution of a physical access/invasion of an external memory bus or via the electrical connections on the processor itself.

Early secure coprocessor efforts, such as the IBM 4758, attempted to circumvent at least some of the technical challenges of secure computing by providing a protected compartment for sensitive data and calculations. Other types of security features used for software protection include stack protection, memory management unit modifications, memory integrity verification, and memory segmentation. Some parties have proposed even more subtle protection mechanisms such as flow control obfuscation, execution flow tracking, executable augmentation, and program shepherding. Most, if not all, of these approaches provide only limited protection against unauthorized execution and, moreover, fail to provide adequate privacy and protection against unauthorized access to the software or data. Moreover, a significant drawback with existing hardware-focused architectures is that they typically require substantial alteration of the host processor operating system or memory subsystem.

In addressing the many drawbacks and failings of the prior art approaches, the inventors developed a hardware-facilitated secure software execution environment (SSEE) method and apparatus which does not require substantially altering the user's host computing environment and which solves the problem of protecting the integrity and confidentiality of executable software and raw data during storage, distribution and/or execution. Effectively, the native CPU/processor hardware and memory systems protected by the SSEE may be treated as inalterable black boxes—requiring little or no change to the programs running on it. The hardware-based SSEE implementation disclosed herein provides privacy and anti-tamper protection for both proprietary software and raw data, and may be readily implemented within most networked and embedded computing systems. The illustrative example SSEE disclosed herein may also be implemented as an architectural augmentation for conventional microprocessors and conventional multiprocessing operating systems such as Linux.

The heart of the architecture of the SSEE is based upon two primary functional units: an encryption management unit (EMU) and a secure key management unit (SKU). In the disclosed non-limiting illustrative example implementation of the SSEE, the EMU is a hardware-based logic core that provides a 'just-in-time-for-execution' memory-page level decryption of encrypted executable instructions (or encrypted raw data) which may be obtained from a non-secure source (such as an unprotected memory device). A secure external key source communicates over a secure channel with the SKU. The SKU functions to supply and/or to build decryption keys for the EMU according to a predetermined key management scheme by using credentials stored on the secure external key source. The SKU combines the credentials in one of a variety of ways to create the keys for the EMU. This simplistic architectural arrangement of specific functional components within the SSEE provides a security framework that explicitly trusts only hardware while augmenting, rather than replacing, any existing process isolation mechanisms (such as memory management) that are controlled by the operating system.

In the non-limiting illustrative example implementation disclosed herein, a Harvard architecture CPU core is instantiated on the same silicon chip along with the encryption management unit (EMU) circuitry and the secure key management unit (SKU) circuitry. Specific credential information is acquired from one or more sources and combined by the SKU circuitry to select or generate one or more security (cryptographic) keys that are provided to the EMU for use in decrypting encrypted program instructions and/or data obtained from a non-secure off-chip memory device.

At least one beneficial aspect of the above architectural arrangement is that it readily enables use of various strong multi-key encryption schemes. For example, one possible multi-key management scheme might rely on multiple cryptographic keys and/or credential identifiers for accessing/creating a key which are provided to users by a software application developer or other distribution controlling authority. Each user then keeps their own personal cryptographic key or key credential identifiers stored on a separate individually assigned secure source device, such as a smart card, a flash dongle or a secure token. Alternatively, specific decryption keys and/or key credential identifiers may be provided by the software application itself or even from a specific instantiation of the processing system hardware or any combination of the above.

As also mentioned above, one aspect of the exemplary non-limiting illustrative implementation of the hardware-facilitated secure software execution environment and method described herein is the use of page-level encryption. Many, if not most, contemporary computing platforms/environments operate using at least some form of virtual paged memory. As is well known in the art, a virtual paged memory arrangement allows a program (or selected data) to be represented virtually within the physical system main memory space. A translation look-aside buffer (TLB) is conventionally used to provide the virtual-to-physical address mappings. Pages of the program (or data) may be easily mapped in and out of memory as necessary, with different pages from different programs populating the same physical memory space at different times. This arrangement, among other things, enables multiple programs to exist in main memory at the same time and also allows programs that are larger than the existing system memory to have a subset of pages loaded for execution. In the disclosed SSEE page-level encryption arrangement, each page in a computing system's non-secure physical main memory is associated with a specific key and possibly some additional ancillary data. The EMU decrypts a single memory page of encrypted instructions (or data) per single corresponding encryption key provided by the SKU. In this manner, different encryption keys may be used for different memory pages of the same program, strengthening encryption and preventing replay attacks between pages.

Another aspect of the SSEE is that, although instantiated on the same chip, the CPU core does not have direct physical access to the SKU circuitry or to any of the actual encryption key values that are generated by the SKU or used by the EMU. Yet another aspect of the SSEE is that different secure applications can share memory pages using the same key, while using different keys for non-shared memory. This arrangement permits the use of shared, secure libraries, even though each library may maintain its own unique security credentials. A further aspect is that page level encryption may be easily implemented by supplementing operations already existing in the CPU's operating system and memory management unit (MMU) hardware. For example, the operating system may provide on-demand paging where a memory page is mapped in the translation look-aside buffer (TLB) when a virtual page is not already mapped-in. In this example, the operations that load the TLB on-demand are simply extended to also load the page-key mappings in the secure software execution environment architecture at the same time so that no additional event handlers or interrupts are required.

Unlike other security approaches, the disclosed hardware-facilitated secure software execution environment (S SEE) and method provides confidentiality and integrity both program instructions and data without the need for placing trust in any particular software module or significantly altering the execution of the software or the particular operating system that is used.

BRIEF DESCRIPTION OF THE DRAWINGS

These and other features and advantages provided by exemplary non-limiting illustrative implementations will be better and more completely understood by referring to the following detailed description in connection with the drawings, of which.

DETAILED DESCRIPTION

Exemplary non-limiting illustrative implementations of a hardware-based security method and apparatus for providing a secure software execution environment that protects software applications and data from unauthorized access and execution are now described. The exemplary method and apparatus disclosed herein may be used, among other things, for maintaining confidentiality and integrity of software during distribution, in external memories, and during execution, as well as for preventing of reverse engineering, unauthorized execution and unauthorized distribution of software and data.

Figure 1:
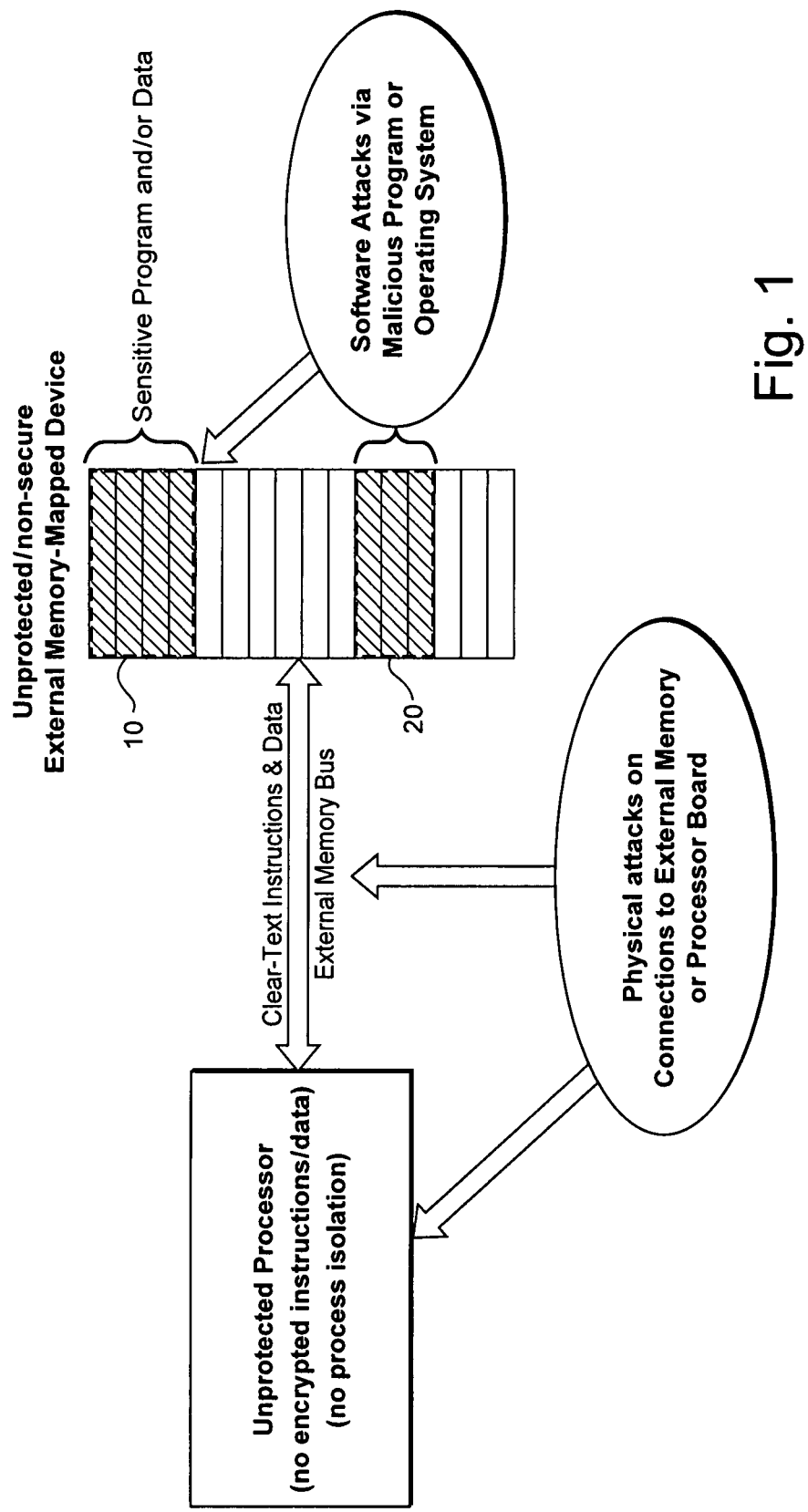
FIG. 1 is a diagram illustrating some common security vulnerabilities and potential threats that software may be exposed to in a contemporary computing environment.
Figure 2:
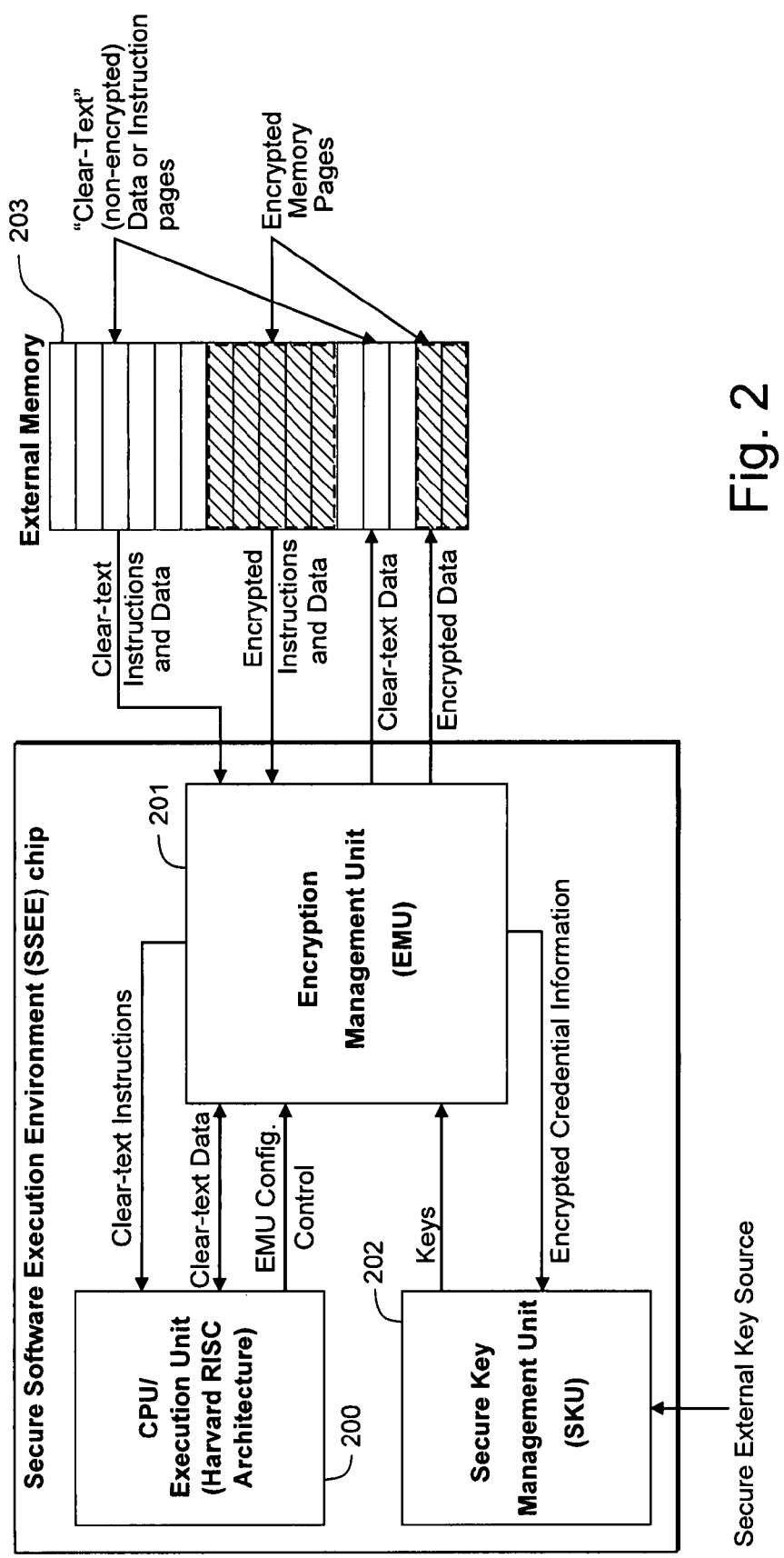
FIG. 2 is a high level schematic drawing illustrating the architectural arrangement of basic functional components for a non-limiting exemplary implementation of a hardware-based secure software execution environment (SSEE)

Referring to FIG. 2, a high level function block diagram is shown which provides an overview of the basic architectural arrangement for a non-limiting exemplary implementation of the hardware-based secure software execution environment. Three fundamental functional units of the disclosed SSEE architecture are depicted and described with reference to FIG. 2: 1) a CPU/Execution Unit; 2) an Encryption Management Unit (EMU); and 3) a Secure Key Management Unit (SKU). In the example implementation disclosed herein, the EMU 2001 is situated on a semiconductor chip with a local CPU 200, which comprises the software execution computing environment, and a connection to an external (off-chip), non-secured program and data storage memory 203. One skilled in the art can appreciate that the disclosed examples illustrated in the accompanying FIGURES are not intended to be limited solely to implementations having the EMU and CPU on the same silicon chip as the SKU. For example, implementations wherein the SKU and the EMU are not instantiated on the same silicon chip are also contemplated. Although the overall security of the SSEE may be somewhat lessened in such an implementation, it would not necessarily be eliminated or easily compromised and, therefore, would still serve to provide a useful secure alternative.

When the CPU executes a software application or a set of instructions, the EMU intercepts and selectively applies decryption to encrypted programs and data obtained from the external memory device 203 and selectively writes back encrypted data to the external memory device. Architecturally, the EMU may be viewed as a security-enabled cache controller which interfaces with a CPU's instruction and data caches or pathways to memory. In the non-limiting example implementation disclosed herein, the EMU is configured to support the complexity of contemporary multiprocessing operating systems by providing encryption at a memory-page level of granularity—i.e., each encrypted memory page may have a corresponding unique associated cryptographic key that is used by the EMU to decrypt the instructions and/or data stored on that particular page of memory. Although the use of memory-page level granularity is provided herein as an example arrangement for encrypting information stored in memory, the SSEE and EMU processes are not intended to be limited to this particular implementation or this level of encryption granularity and may be configured to operated at different or other useful levels of encryption granularity. Moreover, some pages containing executable code, such as that used for shared system libraries, or the operating system kernel may be left unencrypted in clear text form and will be passed unaffected through the EMU. Similarly, data can be written in clear text through the EMU to the External Memory as required by the currently-executing program.

CPU/Execution Unit 200 is a Harvard type architecture processor having separate data and instruction paths to external memory. In the example shown in FIG. 2, an external memory device 203 is used to store both non-encrypted information as well as encrypted programs/applications (i.e., executable instructions) and data. In FIG. 2, encrypted blocks/pages of data and instructions residing within external memory 203 are indicated by hatch-marked areas. The operating system used with CPU/Execution Unit 200 may also be set up (or modified) to recognize predetermined security tags and/or header sections associated with particular blocks/pages of the encrypted program/application data and/or instructions stored in main external memory 203. These "secure executables" use the same basic data formats and standards as conventional executable code/data and also include additional header information used for informing the EMU which instruction pages are encrypted, providing identifiers (IDs) of cryptographic keys for associated encrypted pages, and/or for providing additional security credential information associated with particular pages of memory. The IDs are not the cryptographic keys themselves; they are merely identifiers that reference which key or key set is necessary to decrypt the given page of memory according to a pre-existing key management scheme.

A secure executable loader program running on CPU 200 is configured to provide page-to-key-identifier mappings based on the IDs provided by the secure executable at the same time that the operating system handles virtual-to-physical address mappings in the translation look-aside buffer (TLB). Performing these mapping operations together ensures that memory fetches will always reference the most current page of encrypted information from memory. In addition, although the operating system is configured to associate each page of memory with a different key identifier, it never has direct access to any actual key value; instead, the operating system is permitted access only to an index of key identifiers that serve as pointers to a separate table memory containing the keys. One of ordinary skill in the art would appreciate that one may readily implement simple extensions to the page handling routines of the conventional memory handling mechanisms of the operating system to establish this relationship between groups (pages) of encrypted instructions/data in memory 203 and the key pointers stored in the index. Moreover, third party software application developers may designate secure shared memory and secure dynamic libraries by using the same key for those applications and libraries that need to share data but maintaining individual private keys for those applications that do not.

Figure 5:
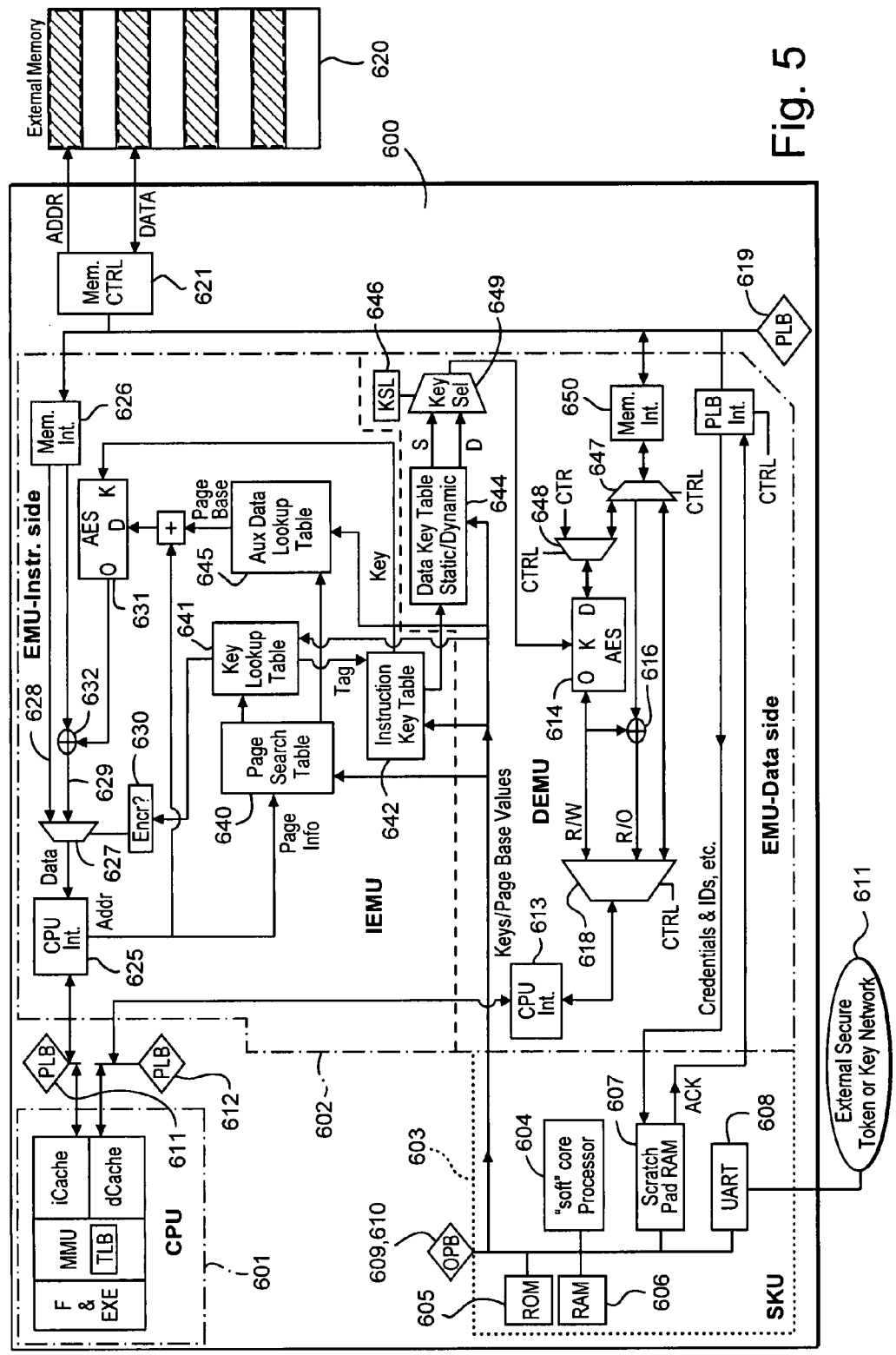
FIG. 5 is a detailed schematic diagram of an exemplary circuit for implementing a hardware-based secure software execution environment chip.

As illustrated by the arrowed lines in FIG. 2, the EMU has several functional interfaces with other components. One interface is with the external non-secure memory, from which it fetches instructions and/or data whenever a corresponding request for instructions and/or data is made by the CPU. This interface between the EMU and External Memory is represented in FIG. 2 by two arrows. One arrow represents the clear-text instruction and data requests; the other, the encrypted instruction and data requests. While encrypted instructions must necessarily first be decrypted prior to being provided to the CPU's respective instruction or data datapath, un-encrypted instructions and data are passed through the EMU to the CPU unaltered. Another interface is with the CPU's instruction datapath, from which instruction fetch requests are received and to which decrypted instructions are delivered. Similarly, another interface is with the CPU's data datapath, from which data fetch and write requests are received, to which decrypted/clear-text data is delivered, and from which clear-text data is received for writing to external memory. A configuration control interface between the CPU and the EMU is used to pass information about currently executing programs. For example, if a currently executing program is a secured executable or encrypted program, its credential identifiers are passed via this interface to the EMU. The EMU then passes those credential identifiers via a separate interface to the SKU. The SKU then responds on a separate interface with the keys necessary to decrypt the currently-executing program. The EMU then caches these keys for future use in an internal Key Table (FIG. 5).

The EMU decrypts encrypted program and data obtained from an external non-secure, off-chip, program and data storage memory 203. In the process of performing decryption operations, the EMU maps a physical page of memory 203 to a specific "key slot" in an internal Key Table where a decryption key is stored. This operation is effectively an extension of the conventional memory management unit (MMU) operation of virtual-to-physical page address translation and is accomplished by adding physical memory page-to-key slot mappings. These physical page-to-key slot mappings are made possible through the use of one or more lookup tables internal to the EMU. In addition, ancillary information/data may also be supplied directly from CPU 200 to be used along with key information obtained from SKU 202. As instructions are requested by CPU 200, the encryption status (which indicates whether the particular memory page is encrypted) and the particular key slot containing the decryption key corresponding to its page in external memory are searched (i.e., looked-up) in the internal Key Table of the SKU (FIG. 5). The EMU then uses the key found in the key slot to selectively decrypt an instruction stream or raw data stored within that memory page. Raw data (as opposed to executable instructions) that is received from memory 203 is handled independently in a similar fashion by the EMU. The key management scheme enforced by the EMU's tables also associates instruction keys with data keys. These associations determine which instructions are able to operate on which data in the various pages of memory, as enforced by the fact that instructions without the correct associated data keys will not be able to properly decrypt pages of memory for which the EMU does not grant them the decryption key.

The EMU may support numerous cryptographic algorithms and ciphers, as well as various modes for those ciphers. For example, different cryptographic modes, such as electronic codebook mode, cipher-block chaining mode, cipher-feedback mode, Galois counter mode, and standard counter modes Encryption/Decryption may be used based on the particular computing environment architectural constraints. Keys stored in the EMU reflect the cryptographic key for a particular page, while ancillary data provided by the CPU contains supporting information for certain cryptographic modes such as, for example, page-specific initial counters values used for Counter Mode encryption and initialization vectors for various other encryption modes. Information supplied to the EMU indicates whether a particular page is encrypted in addition to the encryption key and ancillary data if it is encrypted. The EMU also protects other sensitive operations of the execution environment architecture from the CPU by not allowing the CPU to have physical access to any key. The CPU can only communicate page-to-key-identifier associations to the EMU.

The Secure Key Management Unit (SKU) 202 generates keys used within the secure software execution environment architecture. For example, a user may maintain a physical secure token device (e.g., a flash memory device, smart card, secure token, or an iButton device) containing partial security credentials, which may be specific to a simple user or a group of users. Additional executable partial security credentials may be supplied to the SKU by the operating system or from an internal storage memory or key generation unit on the SSEE chip at run time. The CPU may also supply a processor-specific partial credential. The SKU then uses the application, user SSEE chip, and CPU supplied credentials to generate a key. The key is then inserted into a specific key slot (storage location) within a key table in the EMU. All partial credentials used in key generation must be valid for a correct key to be created.

Figure 3:
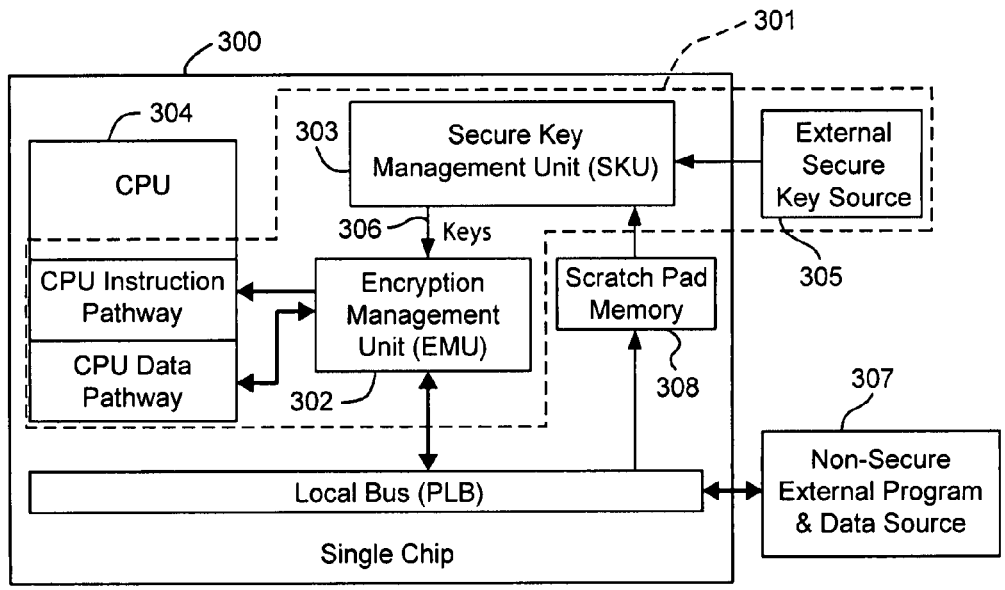
FIG. 3 is a more detailed schematic drawing illustrating primary signal pathways of the SSEE of FIG. 2.

FIG. 3 shows a different high level block diagram of the CPU, EMU, and SKU functional units of the example SSEE chip 200 of FIG. 2 that further illustrates the CPU architecture with separate instruction and data pathways between the EMU and the separate instruction and data pathways of the CPU memory manager. Commonly, these separate instruction and data pathways in the CPU are realized separate instruction and data caches. The dotted line area 301 in FIG. 3 indicates functional components that are protected from software attacks and may be readily made secure from physical attacks as well. Arrows in FIG. 3 indicate the general flow of instructions and data. Preferably, EMU 302, SKU 303, and associated support logic are instantiated on the same single semiconductor chip along with the CPU 304, a local on-chip bus (PLB), and distinct CPU instruction and data pathways. Placing these three main functional units on the same semiconductor chip, among other things, serves to preclude physical access/tamper via interconnections between the various functional units within the SSEE. Commonly, these separate instruction and data pathways in the CPU are realized separate instruction and data caches.

Credential information is acquired from one or more sources, such as, for example, from the external key source 305 or from the executable software or from the CPU core itself, and is used by SKU 303 to identify and/or create security keys 306 that are provided to EMU 302 for storage within an internal Key Table (FIG. 5) and/or to select one or more previously acquired security keys maintained within the Key Table. Selected cryptographic keys are then used by the EMU in decrypting encrypted program instructions and/or data obtained from non-secure external, off-chip source 307. Although in the disclosed example implementation of FIG. 3 off-chip source 307 is an external page-addressable memory device, the use of other forms of page-addressable program and data storage or sources are also possible.

Although SKU 303 preferably resides on the same physical die as CPU 304, it is architecturally isolated from any direct access by CPU 304. To accomplish this, a small scratch pad memory 308 is provided that allows CPU 304 to provide information to the SKU while preventing the CPU from having any read access to or direct influence on SKU functions. Although not shown in FIG. 3, external secure key source 305 may likewise be configured to communicate with SKU 303 using a similar scratch pad memory interface arrangement to provide a secure key source interface which will not directly expose the SKU to external influences.

A beneficial aspect of the disclosed SSEE architectural arrangement is that it readily enables use of various strong single or multi-key encryption schemes. For example, one possible multi-key management scheme might rely on multiple decryption keys or key credential identifiers which are provided to users by a software application developer or other distribution controlling authority. In this example, each user has their own personal cryptographic key ID credentials stored on separate individually assigned secure source devices, such as a smart card, a flash dongle, or a secure token.

The SKU effectively acts as a secure hardware channel between an external key source and the EMU. When a secure program is executing in the EMU, the EMU passes certain credential identifiers obtained from the memory page to the SKU. The SKU uses this information to build or identify a decryption key based on the user's credentials supplied via the external key source. If the user has supplied the proper credentials necessary to build or identify a proper key, the key is then passed to the EMU, which then decrypts the program's instructions or data in a "just-in-time" fashion before passing them on to the CPU's instruction or data pathway for execution or use by the CPU. If the user does not provide the correct credentials, then the instructions or data will not be decrypted properly and the program or data will not be executed correctly within the CPU resulting in an execution failure. Preferably, the entire key fetch and key generation processing hardware of the SKU and the EMU are both instantiated and encapsulated securely on the same silicon chip as the CPU (for example inside an FPGA or ASIC). In addition, no part of the key fetch, key generation, or instruction decryption process should be directly accessible to the CPU and its software operating system.

Figure 4:
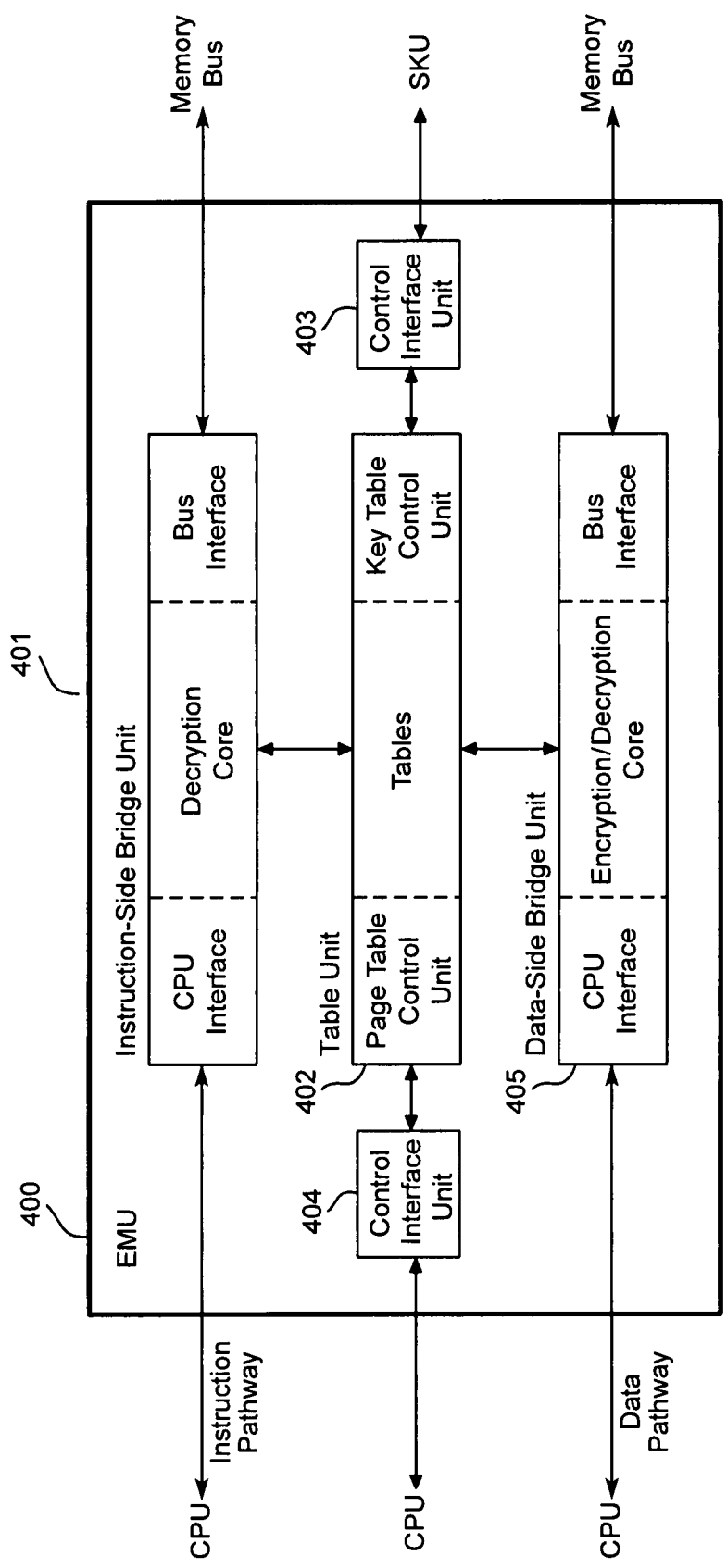
FIG. 4 is a high level schematic drawing of an Encryption Management Unit (EMU) within the exemplary hardware-based secure software execution environment chip.

FIG. 4 shows a high level schematic block diagram of the basic functional units that comprise the Encryption Management Unit (EMU). Between the CPU bus and the memory bus, an Instruction-Side Bridge unit 401 provides bus interfacing functions and includes the decryption core for processing instructions obtained from the non-secure external program and data source 307 (FIG. 3). Basically, Instruction-Side Bridge Unit 401 includes a CPU interface, decryption core and a memory bus interface. Program instructions are obtained from an external source via a memory bus interface, and then processed by the decryption core. Decrypted instructions are provided via the CPU interface to the CPU's instruction pathway for execution. Similar to the Instruction-Side Bridge Unit 401, the Data-Side Bridge Unit 405 provides bus interfacing functions and includes the encryption/decryption core for processing data obtained from the non-secure external program and data source 307 (FIG. 3). The Data-Side Bridge Unit 405 includes a CPU interface, an encryption/decryption core, and a memory bus interface. Program data is obtained from an external source via a memory bus interface, and then processed by the decryption portion of the encryption/decryption core. Decrypted data are provided via the CPU interface to the CPU's data pathway. When the CPU alerts the Data-Side Bridge Unit 405 that it needs to write data out to memory, the CPU interface of the Data-Side Bridge Unit 405 receives the data, chooses whether or not to encrypt it with the encryption portion of the encryption/decryption core, and writes the data out to the memory bus through the bus interface.

The EMU decryption and encryption/decryption cores in a preferred implementation support the AES (Advanced Encryption Standard) cipher in any of a variety of modes of AES encryption and decryption. Two example block decryption schemes are generally described below: Electronic Codebook Mode (ECB) and Counter Mode (CM) block decryption. One of ordinary skill in the art would appreciate that the EMU is not limited to solely these two modes of encryption and decryption and that other modes can also be used. These alternative modes include, but are not limited to, Cipher-Block Chaining Mode, Cipher Feedback Mode, and Output Feedback Mode.

Table Unit 402 of the EMU contains various table memories that are used to store one or more cryptographic keys as well as indices or pointers that are used in determining which keys to provide to the Decryption Core of the Instruction-Side Bridge Unit 401 or the Encryption/Decryption Core of the Data-Side Bridge Unit 405. In particular, Table Unit 402 includes a Key Table for storing cryptographic keys and a Page Table for storing memory page-to-key mappings for correlating used correlating external memory page addresses to specific keys. The Table Unit 402 also encapsulates both a Page-Table Control Unit for monitoring the CPU's MMU and TLB activity through the Control Interface Unit 404 and a Key Table Control Unit for communicating key and credential information to the SKU through the Control Interface Unit 403. Based on information obtained from the SKU via Control Interface Unit 403, Key Table Control Unit 405 controls the storing and access to encryption keys in the Key Table storage memory within Table Unit 402. Page Table Control Unit controls use and access of the Page Table memory in Table Unit 402. Control Interface Units 403 and 404 simply provide conventional interfacing for control signals and information passed between the SKU, the CPU and the EMU.

Example Electronic Codebook Mode Decryption Implementation:

Basically, Electronic Codebook Mode decryption begins with a CPU request for instruction or data. If the CPU is requesting instructions, the CPU's Instruction Pathway signals the Instruction-Side Bridge Unit; if the CPU is requesting data, the CPU's Data Pathway signals the Data-Side Bridge Unit. The remainder of this example assumes the CPU is requesting data; the example would be similar if it were requesting an instruction. The request is forwarded to a memory bus arbiter within the EMU and when the bus acknowledges the transaction address, the base page of the address is supplied to the EMU's Table Unit to determine the encryption status of the memory page information. If the page is not encrypted, data in that page are passed directly to the CPU's Data Pathway for use by the CPU. If the memory page is determined to be encrypted, the encrypted information received from the Memory Bus via the Bus Interface is provided for to the decryption portion of the Encryption/Decryption core which initiates decryption and provides the result to an output buffer when complete. The decryption in AES Electronic Codebook Mode takes place by providing the encrypted data to the data input of the AES cipher, the correct key from the key table to the key input of the AES cipher, and running the AES cipher. The resultant decrypted data is captured directly from the output of the AES cipher. The decrypted data is then provided to the data pathway of the CPU. If the CPU's Instruction Pathway requests instructions, those instructions would be decrypted by the Instruction-Side Bridge Unit's Decryption Core in an similar operation as the above example. Although an explicit example of Codebook Mode encryption is not provided herein for reasons of brevity, one skilled in the art would readily know and appreciate how such encryption may also be provided in the disclosed SSEE implementation.

Example Counter Mode Decryption Implementation:

Counter Mode encryption and decryption operates by taking a non repeating value, encrypting it using a key, and then 'XORing' the result against a specific block of data. This is achieved through the use of base and offset values.

A counter is used that is a combination of a base page counter, stored as ancillary data in the Table Unit 402, and the offset address into the page of the requested transaction from the external memory. The base page counter ensures no values are repeated between pages, and the offset address component ensures there are no repeated portions within the same page.

As with block mode, once it is determined that the page of input information is encrypted, the base page counter is added to the offset address for the requested instruction/data to create a unique counter value. This counter value is encrypted using a key retrieved from the key tables in the same manner of key retrieval as in any other encryption mode. The block of encrypted information that results from encrypting this counter value with the retrieved key is referred to as a pad. As information is received from the off-chip memory, it is decrypted by XORing it with this pad. Once the pad has been used once, a new pad must be created. This happens by adding the next offset address with the base page counter, creating a new counter value which is encrypted by the key to create the new pad. Once decryption is complete, the information is passed to either the CPU Instruction Pathway or the CPU Data Pathway based on which one made the instruction request. In a preferred instance of the EMU, Counter Mode is only used as a means of decrypting read-only instructions or data and is not used to encrypt anything that will be written back to memory.

Referring again to FIG. 4, interfaces to the EMU Table Unit 402 of the EMU are now described. Two separate interfaces are used to control loading and access to tables within Table Unit 402: a Key Table Control Unit 405 which interfaces with the SKU bus through the Control Interface Unit 403 and is used to load the keys into specific key slots within the Key Table Control Unit and a Page Table Control Unit which interfaces with the CPU through the Control Interface Unit 404 and loads pointers to page key slots corresponding to memory page and any memory page ancillary data mappings). Although the CPU and the SKU may both access an interrelated set of tables within the EMU Table Unit, the CPU may not read or write the cryptographic keys directly in Key Table within Table Unit 402.

Page Table Control Unit

Page Table Control Unit within Table Unit 402 uses a control register set and associated logic for enabling the CPU to interface with Table Unit 402. The Page Table Control Unit also includes a memory for storing the page address to search in the tables of the Table Unit, a page index memory for storing page mappings, a memory for storing the particular Key slot in the key Table to which the page address is mapped, and a memory for storing 128-bits of ancillary information associated with the particular page being processed. When a page index value is written to the page index memory, Page Table Control Unit, in turn, writes the indexed contents of the page address, key slot, and ancillary data memories into the appropriate tables of Table Unit 402 at the location specified by the page index memory.

Key Table Control Unit

In a manner similar to Page Table Control Unit, Key Table Control Unit enables the SKU to load keys into specific slots within the key table. When a value is written to a key index memory, the Key Table Control Unit initiates a transfer of the contents of all key registers to the key slot in the key table of the Table Unit 402 specified by the key slot register.

Control Interface Units

Control Interface Units 403 and 404 each include similar conventional circuitry for providing generic signal interfacing functions that allow Key Table Control Unit and Page Table Control Unit to communicate with the SKU and memory buses.

Referring now to the schematic logic diagram of FIG. 5, a more detailed implementation of the functional blocks of FIG. 3 through FIG. 4 is described. In this non-limiting illustrative example, the SSEE circuitry shown in FIG. 5 is implemented using a Virtex-II Pro field programmable gate array (FPGA) 600 which includes a PowerPC processor 601 instantiated on the chip. The "local processor bus" is implemented using the IBM Processor Local Bus (PLB) and its associated protocol. The PowerPC 405 processor used for CPU 601 is instantiated as a "hard" core processor within FPGA 600. A "hard" core being a device instantiated as non-configurable physical components on the FPGA chip as opposed to a "soft" component which is developed using the FPGA's configurable logic. While an FPGA is one example of a silicon device suitable for instantiation of the functional units for implementing the secure software execution environment, the use of an FPGA or a PowerPC processor is not strictly required and the same architectural concepts could be implemented, for example, using an ASIC or other suitable hardware.

CPU 601 also includes conventional logic or circuitry for performing conventional processing functions such as debugging circuitry, instruction fetch & execute (F & EXE) logic, a memory management unit (MMU) having a translation look aside buffer (TLB), as well as separate instruction and data caches (iCache and dCache). While the SSEE is implemented in the presently disclosed example on an FPGA including a PowerPC processor, it is to be understood that the SSEE is not necessarily limited to instantiation on an FPGA or to the use of a PowerPC processor. The SSEE may be readily implemented using, for example, an ASIC and the SKU and EMU functional components may be configured to operate using other processors or processor families.

Although the secure software operating environment instantiation is not constrained to using a PowerPC 405 processor, the processor used must be able to segregate instruction and data requests to memory via separate discrete paths (which is sometimes called a "Harvard" architecture CPU). As illustrated in FIG. 5, CPU 601 uses separate instruction and data caches (iCache and dCache) which each independently make requests on separately instantiated busses PLB 611 and PLB 612. There are, however, other hybrid Harvard/Von-Neumann CPU architectures which may also be used to implement the SSEE as long as the chosen CPU architecture is one that allows management of instruction and data transactions to memory independently. In the example shown in the upper left-hand corner of FIG. 5, instruction and data pathways to CPU 601 are segregated and managed independently by using separate iCache (instruction cache) and dCache (data cache) interfaces on separate local busses PLB 611 and PLB 612.

SKU 603 may be functionally described as a structure that can be queried with a credential identifier and provide in return either the key associated with that credential identifier (and something called page base values, which will be explained later) or an indication that the key requested by the credential identifier is not available. Logic must also be in place to load the table structures in the EMU that we will describe later. The constraint that we universally place on any instantiation of an SKU is that it never betrays the keys to any internal or external entity except the EMU. It is not important whether the SKU gets its keys from an internal or external source or what that internal or external source is, as long as it provides the keys only to the SKU and no other entity. Instead of an external source, the SKU may generate or store the keys internally without use of an external source. The source of the keys should securely isolate those keys from external inspection and provide them only to the SKU for use in the EMU.

The FIG. 5 example instantiation of SKU 603 uses a soft-core processor 604 as a controller. Soft core processor 604 may be, for example, a conventional RISC processor implemented using the FPGA chip's configurable logic. A non-limiting example for us a processor is Xilinx's MicroBlaze. The SKU operations are controlled by a program pre-programmed into ROM 605. The instructions stored in ROM 605 control soft core processor 604 for processing encryption keys and key credential information used for selecting specific encryption keys, as well as for communicating with an off-chip secure key source 611 and external memory 620. Processor 604 reads and executes instructions from ROM 605, uses RAM 606 as its local memory, and communicates with other on-chip devices via on-chip local peripheral bus PLB 619. Scratch Pad RAM 607 is used to effectively isolate the SKU soft core processor 604 from any direct access by other on-chip components and from external memory 620. Among other things, Scratch Pad RAM 607 allows processor 604 to obtain credential identifier and page base table information regarding a page of instructions/data provided by the external non-secure memory 620 via local on-chip buss PLB 619. Scratch Pad RAM 607 can be written to by devices on PLB 619, but it can only be read from by devices on OPB 609, which is isolated from the control of CPU 601. The SKU processor 604 then provides this information to the EMU 602 via internal bus 609. In this example, a UART 608 is used as a means of communicating with the external secure key source 611. When instructed by SKU processor 604, UART 608 queries external secure source 611 to obtain keys and/or user credential information. External secure source 611 may be any type of security enabled or protected source such as a secure physical token or iButton device, a smart card, a secure connection to a key management network, a secure external memory, etc. Alternatively, an Ethernet or other Physical/Link-Layer communications controller or an on-chip memory storage controller may be used instead of UART 608 as appropriate for communicating with an alternative secure key source (see FIGS. 8-10). Processor 604 may also be readily programmed to use a particular predetermined secure communications key-transfer protocol to ensure that the external connections to secure key source 611 are not prone to probing or replay attacks. Public/private key pairs or secret cryptographic keys could be stored in ROM 605 or RAM 606 to support the operation of this protocol.

Although, in many conventional embedded computing systems, there may typically be only one local processor bus, local bus PLB 619 is separate from the CPU local instruction and data buses PLB 610 and PLB 612, and is primarily used for communicating with the external memory 620 via memory controller 621. In the present example implementation, separate PLB controllers 610, 612 and 619) are used to discretely host iCache, dCache, and memory controller transactions. This arrangement enables all memory transactions to be both individually interruptible and separately controlled.

External memory 620 may store both encrypted and non-encrypted programs and data. In FIG. 5, hatched-marked portions of memory 620 represent encrypted programs and data. In the present example implementation, the encrypted (hatched-marked) portions of memory 620 contain instructions or data that is prepared in a manner which 1) encrypts the instructions and data and 2) inserts credential identifiers and page base values that enable the EMU to determine which keys are required to decrypt or encrypt those instructions and data. Associations between credential identifiers and portions of the encrypted information is stored in a header section as explained in greater detail below with respect to FIG. 6.

"Instruction Side" of the EMU (IEMU):

CPU Interface 625 (CPU Int.) handles requests for instructions via the iCache local bus PLB 611 which are intended for external memory. Memory Interface 626 (Mem Int.) passes instruction requests that are received from the CPU iCache to memory and works with Memory Controller 621 to retrieve the requested instructions from external memory. The primary function of Memory Interface 626 and CPU Interface 625 is to interface the communications taking place between the PLB local bus structures and the EMU.

Multiplexer 627 is provided on the EMU side of the CPU interface 625. This multiplexer switches between two inputs 628 and 629. Input 628 is a pass-through data path that enables non-encrypted instruction requests from memory to flow unimpeded from memory through to the iCache. This path is selected when "Encr?" logic 630 indicates that a memory page currently being accessed has not been encrypted and may execute directly on CPU 601 without further processing by the EMU. A second separate data path 629 carries the result of the EMU's decryption process provided by AES logic 631.

In the present example implementation, AES encryption is performed in Counter Mode (CM) for encryption of instructions, although any symmetric key block cipher may be used instead of AES. In this example 128-bit AES keys are used, but other NIST-acknowledged key sizes are also possible. The AES logic circuitry core 631 shown in FIG. 5 has two inputs: one for the key (K) and one for the data in (D). The AES logic core 631 also has one output (O) which provides the encrypted version of the data input at D, which in Counter Mode is a counter value. The particular process that AES logic circuitry 631 applies to the input may be either encryption or decryption. For a consistent use of Counter Mode, AES encryption is used in this implementation at all times to consistently retrieve the same pad at output O each time the same counter is input at data input D.

Counter Mode encryption/decryption (CM) is a NIST-recognized mode of operations for AES. In CM encryption/decryption, the AES core does not directly encrypt/decrypt the input at D. Instead, it encrypts a counter value that is provided to the D input with a key (provided to the K input). The result of the encrypted counter value, referred to herein as a "pad", is then XORed with the encrypted information from memory to produce decrypted information for the CPU. The same pad can be XORed again with the decrypted information to encrypt it. This Counter-Mode encryption operation is not used on instructions in conjunction with AES core 631, since the instructions for the CPU 601 are read-only; therefore, it is never required to encrypt them and write them back to memory. For CM encryption/decryption to be secure, the counter value must never be replicated between two blocks of data (i.e., it must constantly change). For the use of AES CM to be appropriate, it must be shown that counter values are never replicated.

AES logic core 631 takes a counter provided at input D, applies a key input at K, and provides a result at output O. The XOR 632 performs an exclusive or-ing operation upon the results with the instructions that have been retrieved from memory. (Instructions are only read, never written, so this particular core is only used to decrypt. Thus, in the FIG. 5 illustration, the instruction stream to the right side of XOR unit 632 is encrypted while the instructions output at 629 on the left side of the XOR unit are decrypted. A different counter value is input to AES 631 for each memory address request.

When a request to memory for new instructions is generated by the iCache, the bits of the memory request that indicate which page of memory is being requested are passed to a Page Search Table (PST) 640, where entries for the pages that are associated with keys are kept.

If there is an entry in the page search table (PST) 640 for the page being requested, then. PST 640 queries key lookup table (KLT) 641. KLT 641 stores tags that index which key is required to decrypt the instructions in the page that was requested. The KLT has two functions: 1) it tells the "ENCR?" logic 630 whether or not the page requested is encrypted, thus controlling multiplexer 627 to decide between datapaths 628 and 629; 2) it uses the key tag (index) stored in the table to retrieve the correct decryption key.

KLT 641 then passes the tag to the Instruction Key Table (IKT) 642, which indexes the keys by the key tag. The appropriate key is then provided to the AES logic core 631 by IKT 642. A unique counter value is provided for every memory location that needs to be decrypted.

This is accomplished in several steps, the first of which is using the Page Search Table to look up Auxiliary Data about the page in question. The PST communicates with the Auxiliary Data Lookup Table (ADLT) 645. If there is an entry in the PST, there will be an entry in both the KLT and the ADLT. Similar to the credential identifiers, the data stored in the ADLT also comes from the Secure Executable. The ADLT stores "Page Base" values, which are simply 128-bit numbers. There is one page base value stored in the ADLT for each page of memory that stores encrypted instructions. Each number is unique and differs by at least the number of addresses in a page from every other page base value in the system. To get the unique counter for each memory location, this page base value is added to the 32-bit address of the memory request, and the result is passed to the D input of the AES core to form the unique counter.

Encryption keys and page base values are first placed into the EMU Table unit when an executable program or data is first "loaded" or obtained from external memory 620. A "loader" program running on CPU 601 and in External Memory 620 communicates the credential identifier, auxiliary data, and ancillary information stored in a secure executable's header to the SKU through Scratch Pad RAM 607 while it is loading the secure executable into External Memory 620. The credential identifiers are the tags that indicate which keys are necessary to decrypt instruction. Again, the SKU scratch pad RAM 607 is a one-way memory. Consequently, scratch pad RAM 607 may be written-to and may acknowledge that data was written, but it can not be read by CPU 601 or any other external source. It may only be read by SKU 603. No functional component/device other than EMU 602 may gain access to the SKU function. Once the SKU has the credential identifier and auxiliary data information from the secure executable, it can use the credential information from the external key source 611 to match credential identifiers to their credentials.

At this point, SKU 602 can then transfer this information appropriately to the Page Base Table 640, Key Lookup Table 641, Auxiliary Data Table 645, Instruction Key Table 642, and the Data Key Table 644, which will be explained in a following discussion.

"Data Side" of the EMU (DEMU):

As illustrated in FIG. 5, there is also a "data-side" of EMU 602 (DEMU) which handle the processing of pages of data retrieved from memory 620. Also, there is both a 'CPU-side Interface' 613 and a 'Memory-side Interface' 650 for DEMU. Similar to the EMU-Instruction Side (IEMU), the DEMU is provided to interrupt the path between dCache read/write requests to/from memory. Also, it provides an interface to the processor local buses (PLBs) on each side of the DEMU so that all other functional structures in-between CPU 601 and the memory 620 can be independently of the kind of local bus used in the system.

Figure 6:
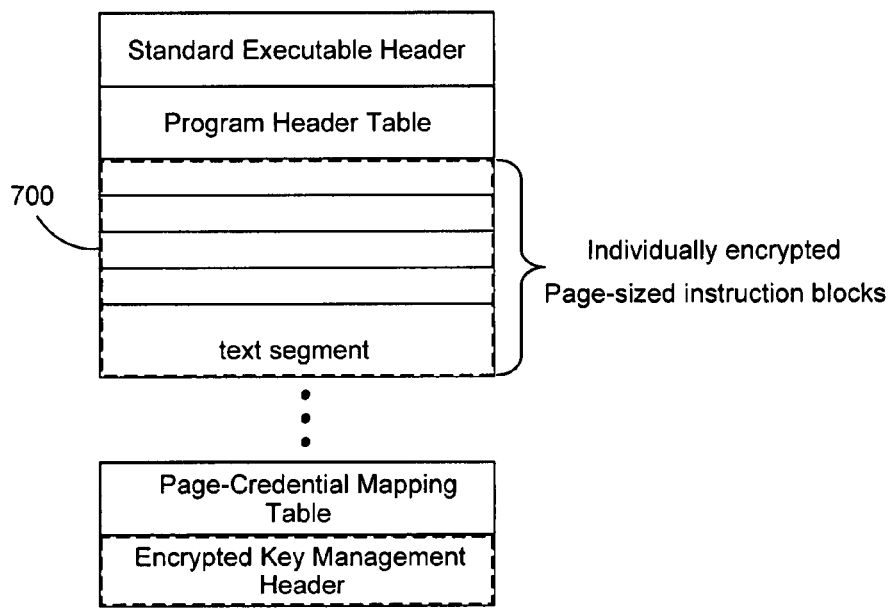
FIG. 6 is an illustrative example block diagram of a secured executable having encrypted blocks of program instructions and data as stored in an external memory device connected to the secure software execution environment chip.

EMU data-side Multiplexer 618 is used in a manner similar to multiplexer 627 on the EMU instruction side (IEMU), multiplexer 618 may also be used to pass unencrypted data directly to/from external memory 620 from/to the CPU dCache. Multiplexer 618 works in conjunction with multiplexer 647, provided on the Memory Interface side of DEMU. The same control logic (CTRL) (not explicitly shown) decides between data paths for each of these multiplexers 618 and 647. Although this control logic is not the same as that for multiplexer 627, it functions similarly to that used on the instruction processing side of the EMU (IEMU). Although explicitly depicted in FIG. 5, the control logic throughout FIG. 6 is conventional logic circuitry used for timing and gating control signals to control operation of multiplexers.

Referring now to Data Key Table (DKT) 644, appropriate pointers are placed in Instruction Key Table (IKT) 642 that index the instruction encryption keys with data encryption key sets that the currently processing instruction page is permitted to access. DKT 644 stores such key sets. A page from memory 620 containing encrypted instructions is able to access two different types of data keys: sets 1) static keys for read-only data in memory, and 2) dynamic keys for read/write data. DKT 644 stores both types of key sets.

Key selection multiplexer 649 decides which key type is appropriate for the current transaction under the control of Key Selection Logic (KSL) 646. Static (S) or dynamic (D) keys are obtained from DKT 644 and KSL, selects which key type is provided to AES decryption core 614. As mentioned previously, Data Key Table 644 is also loaded by the SKU when executables are loaded into memory 620.

Similar to its use in the IEMU, the key provided by the Key Selection Multiplexer 649 is used by the DEMU's AES encryption/decryption core 614 for encryption/decryption operations. In addition, it also supports two different modes of operation. The first mode is for data in memory which needs to be encrypted when written to memory and decrypted when read from memory. In this instance, KSL 646 selects a dynamic data key. The multiplexer 647 for the Memory interface would select the top-most datapath, and the mux 648 that switches data inputs for the D interface of AES core 614 would select its bottom-most data path. These two multiplexers work together to transfer the data from the memory request directly to/from AES core 614 for Electronic Codebook Mode encryption and decryption. This differs from the Counter Mode, in that Electronic Codebook Mode directly encrypts/decrypts the data that is to be protected. The O output of AES core 614 passes unencrypted data to the CPU-side multiplexer 618 for transfer to the CPU dCache. Similarly, the reverse of this process occurs whenever data is written to external memory 620. Unlike the IEMU, data may be written to external memory 620 by DEMU. (The O and D interfaces of AES core 614 operate in reverse when this happens). Also AES core 614 will be operating in an encryption mode rather than a decryption mode. Although FIG. 5 does explicitly depict AES core 614 operation for both encryption and decryption modes, one of ordinary skill would appreciate that AES core 614 is configured to provide both encryption and decryption functions.

The preceding description outlined both the read/write and pass-through operation of the DEMU side of EMU 602. The following describes the read-only operations. The read-only operations are similar to the IEMU operation. KSL 646 indicates that a static key should be used by the AES core. Multiplexer 647 on the memory interface 650 passes incoming data along to XOR 616 multiplexer 648 selects the counter input (CTR) and passes this to the D input of AES core 614. This Counter value (CTR) is developed in exactly the same manner as the Counter value that serves as input D to AES core 631 on the EMU's instruction side (IEMU). The data flowing out the AES core is a pad that is XORed with the data from memory in order to decrypt it. The read-only data is never written to memory 620 and is decrypted in basically the same manner as decryption of instructions during Counter Mode operation.

EMU 602 is provided with both Block and Counter Mode on the data side of its operations (i.e., the DEMU) because Counter Mode decryption provides high performance and Block Mode provides secure read/write data.

FIG. 6 shows a block diagram of an example "Secure Executable" (SE), consisting of encrypted blocks of program instructions and data along with associated header and ancillary information. Such an SE could be stored in an external memory connected to the secure software execution environment chip. Page-sized instruction blocks 700 are individually encrypted. To create and SE, unencrypted information in the "text" segment of the executable (where instructions and data are stored) is first encrypted. The Standard Executable Header and Program Header Table represent common segments of an executable that are used by the operating system; they are not modified in this example. The Page-Credential Mapping Table (PCMT) is added to the SE to match the encrypted pages in the text segment to credential identifiers. The credentials identified in the PCMT may indicate to the SKU that several credentials acquired from the secure external key source must be combined in novel ways to decrypt the pages. The methods and sequences of credential combination are described in the Encrypted Key Management Header (EKMH), which can be encrypted in any scheme and with any key programmable into the SKU. For added security, the page base counters indicated in the description of FIG. 6 could be placed in the EKMH. (Alternatively, these page base counters could be provided by the external key source 611.) This Secure Executable may be automatically prepared by a separate secure executable generating application that takes as its input an unencrypted (clear-text) executable that is formatted for the CPU and the operating system running on the SSEE chip 600. When converting a clear-text executable into a secure executable the SE generating application would create headers in the executable that contain specific credential identifiers. These credential identifiers are associated with particular AES cryptographic keys used to encrypt the secured program and data segments/pages in the SE. For example, a unique key can be associated with each memory page of executable instructions or data. Since this software securing process is performed after software development takes place, software developers would not be burdened with the need to incorporate any security elements or features into the application code during software development.

The Secure Executable example implementation depicted in FIG. 6 contains only encrypted program data or instructions and headers containing the credential identifiers indicating the keys necessary to decrypt the encrypted segments. The SE does not include or contain any of the AES keys. Thus, if an encrypted application program was intercepted by an attacker in this format, it would be virtually impossible to reverse engineer without undergoing the computationally expensive task of breaking AES. Consequently, using this SE, an application program or sensitive raw data is made secure for distribution and also is made secure against unauthorized execution.

Figure 7:
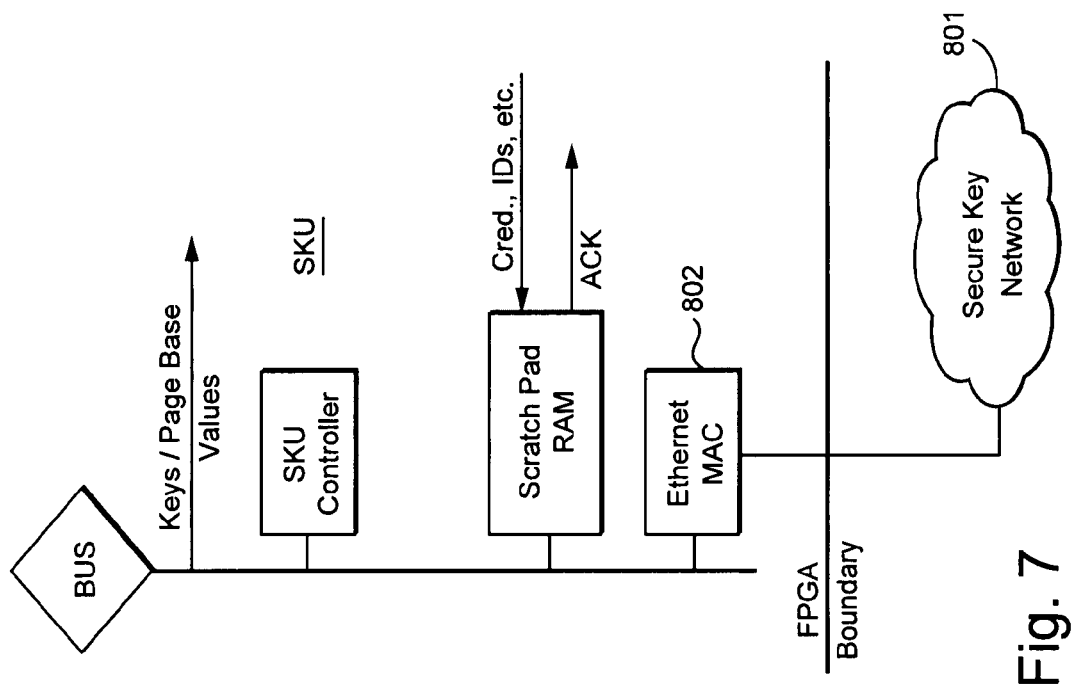
FIG. 7 is an exemplary schematic diagram of an alternate example implementation of the SKU using a secure key network.

FIG. 7 shows an exemplary schematic diagram of an alternate example implementation for SKU 603 of the secure software execution environment chip 600 wherein the SKU is coupled to an external secure key network 801. In this example instantiation of the SKU an Ethernet MAC 802 is provided for communicating across the chip boundary to external secure network 801 for obtaining keys or secure data used to construct keys. Alternatively, Ethernet MAC 802 could be replaced equivalently by any Physical/Link-Layer communications controller.

Figure 8:
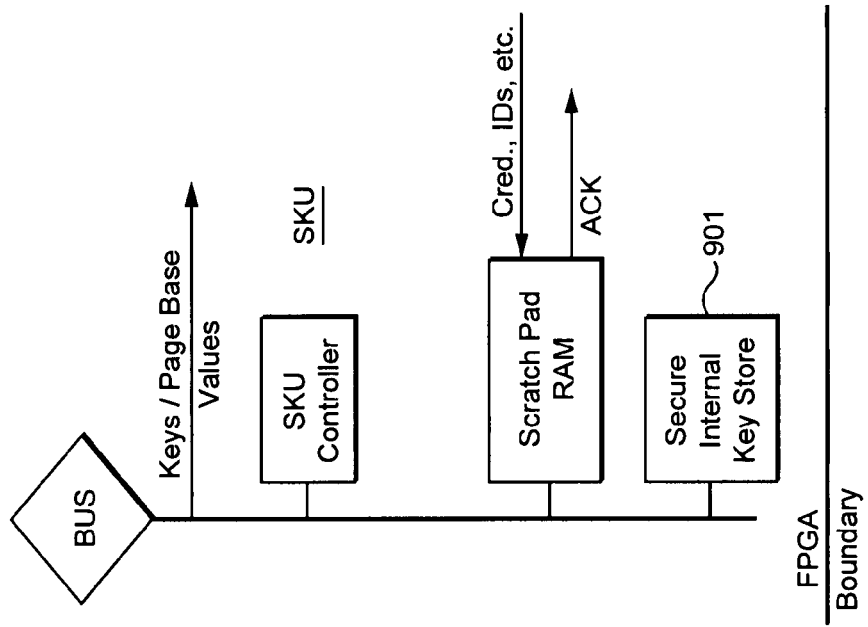
FIG. 8 is an exemplary schematic diagram of an alternate example implementation of the SKU using a secure internal key store.

FIG. 8 shows an exemplary schematic diagram of another alternate example implementation of SKU 603 for the secure software execution environment chip 600 wherein the SKU includes an on-chip internal secure key storage 901. For example, a block of RAM may be instantiated on SSEE chip 600 as part of SKU 603 and loaded securely as part of an encrypted bitstream programming process. Likewise, in an ASIC implementation of SSEE chip 600, a unique preprogrammed ROM could be used for internal key store 901.

Figure 9:
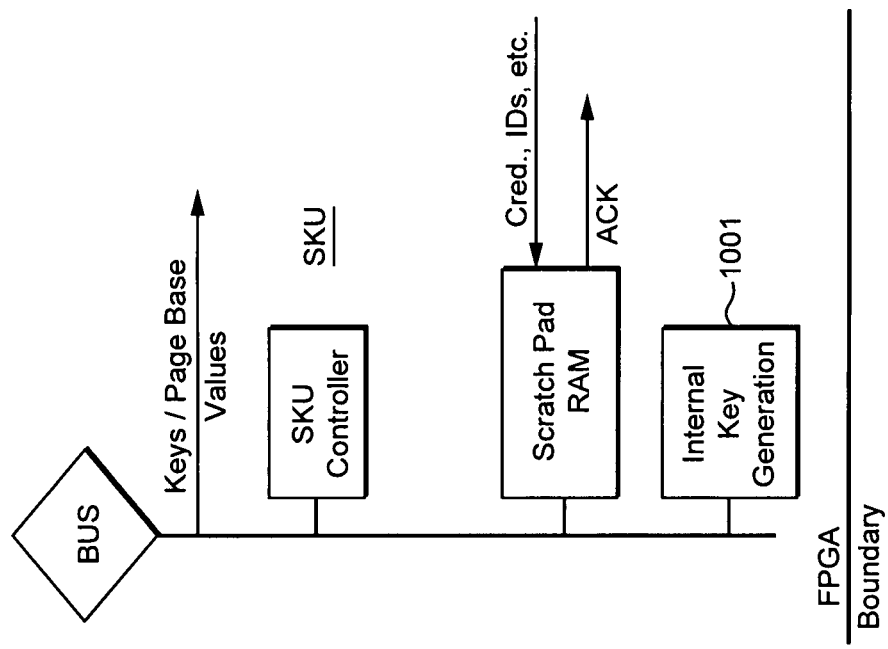
FIG. 9 is an exemplary schematic diagram of an alternate example implementation of the SKU using internal key generation.

FIG. 9 shows an exemplary schematic diagram of yet another alternate example implementation of the SKU of the secure software execution environment chip wherein the SKU uses internal key generation. In this non-limiting illustrative example, the credential identifiers are used as a means of reliably re-generating keys from a key generation logic component 1001 instantiated on the SSEE within the SKU. This implementation does not require any permanent storage of keys—just conventional logic that can generate the same keys from specific seed values (e.g., the credential identifiers used as seed values).

While the technology herein has been described in connection with exemplary illustrative non-limiting implementations, the invention is not to be limited by the disclosure. The invention is intended to be defined by the claims and to cover all corresponding and equivalent arrangements whether or not specifically disclosed herein.

The invention claimed is:

1. A secure software execution device that provides protection for both program instructions and data against unauthorized access and/or execution, comprising:

CPU core circuitry on a semiconductor chip, the CPU core circuitry comprising a Harvard architecture type processor having physically separate information pathways and storage memories for instructions and data;

encryption management unit (EMU) circuitry instantiated on the semiconductor chip, the EMU circuitry comprising circuitry for storing one or more encryption keys for encrypted instructions and circuitry for storing one or more encryption keys for encrypted data, the EMU circuitry configured having an information processing pathway specifically for data and an information processing pathway specifically for instructions that is separate and isolated from the information processing pathway for data, and the EMU circuitry being operable to maintain one or more associations between encryption keys used for instructions and encryption keys used for data accessed by the instructions and to accept encrypted instructions and encrypted data via separate isolated pathways from an off-chip source and to provide decrypted instructions and decrypted data via separate isolated pathways to the CPU core circuitry for execution based on one or more encryption keys; and a secure key management unit (SKU) circuitry instantiated on the semiconductor chip and isolated from direct access by the CPU core circuitry, said SKU configured to acquire credential information from one or more sources and, based on the credential information, identify or generate one or more encryption keys for provision to the EMU;

wherein the CPU core circuitry does not have access to encryption key information generated by the SKU and wherein the EMU circuitry is configured to decrypt at least a portion of encrypted instructions or data that is associated with one or more encryption keys provided by the SKU.

2. A secure software execution device as set forth in claim 1 wherein the EMU is configured to encrypt non-encrypted data produced by a software application executed by the CPU prior to being sent to an off-chip source.

3. A secure software execution device as set forth in claim 1 wherein the credential information from one or more sources include an off-chip source.

4. A secure software execution device as set forth in claim 1 wherein the EMU is configured to decrypt a single memory page portion of encrypted instructions or data per single key provided.

5. A secure software execution device as set forth in claim 1 wherein the off-chip source is a non-secure random access memory device.

6. A secure software execution device as set forth in claim 1 configured such that the CPU circuitry is separate and isolated from the SKU circuitry and wherein access to information within the SKU circuitry by the CPU is prohibited.

7. A secure software execution device as set forth in claim 1 wherein credential information is obtained from a secure off-chip source.

8. A secure software execution device as set forth in claim 1 wherein the SKU is configured to receive at least some credential information stored in a smart card device via a secure hardware connection.

9. A secure software execution device as set forth in claim 1 wherein the SKU is configured to receive at least some credential information stored in a flash memory storage device which communicates with the SKU via a secure hardware connection.

10. A secure software execution device as set forth in claim 1 wherein the SKU is configured to receive at least some credential information stored in a USB key storage device which communicates with the SKU via a secure hardware connection.

11. A secure software execution device as set forth in claim 1 wherein the SKU is configured to receive at least some credential information stored in a hardware token device which communicates with the SKU via a secure hardware connection.

12. A secure software execution device as set forth in claim 1 wherein the SKU is configured to receive at least some credential information from an off-chip communications network source via a secure connection.

13. A secure software execution device as set forth in claim 1 wherein said off-chip memory includes encrypted instructions or data encrypted in accordance with a cryptographic algorithm.

14. A secure software execution device as set forth in claim 1 wherein said off-chip memory includes encrypted instructions or data encrypted in accordance with an AES or a DES cryptographic algorithm.

15. A secure software execution device as set forth in claim 1 wherein the secure external source is a flash memory storage device, a ROM device, or a secure token network used for providing a binary token comprising a security key value or credentials information to be used by the SKU in constructing an encryption key.

16. A secure software execution device as set forth in claim 1 wherein the CPU, EMU and SKU are part of an embedded computing device which may be connected to a network of other computing systems.

17. A secure software execution device as set forth in claim 1 wherein the token comprises one or more binary values comprising credentials information from a user, a processor or a specific application program.

18. A secure software execution device as set forth in claim 1 wherein encrypted instructions and data are stored in the external memory at a page-level granularity.

19. A secure software execution device as set forth in claim 1 wherein the EMU is configured to decrypt secure executables immediately prior to execution by the CPU.

20. A secure software execution device as set forth in claim 1 wherein the EMU is configured to decrypt a single memory page of encrypted instructions or data per single encryption key provided by the SKU.

21. A secure software execution device as set forth in claim 1 wherein the CPU is a RISC type processor.

22. A secure software execution device as set forth in claim 1 wherein the CPU is a CISC type processor.

23. A secure software execution device as set forth in claim 1 wherein the encrypted instructions or data from the off-chip source comprise a secure executable software component having a header portion for identifying credential information.

24. A secure software execution device as set forth in claim 1 wherein a particular CPU instantiation is a source of credential information.

25. A secure software execution device as set forth in claim 1 wherein a page of encrypted instructions or data is a source of credential information.

26. A secure software execution device as set forth in claim 1 wherein an external device is a source of credential information.

27. A secure software execution device as set forth in claim 1 wherein at least some credential information is stored in an iButton device and is passed to the SKU via a secure hardware connection.

28. A secure software execution device as set forth in claim 1 wherein the off-chip memory is any memory-mapped device.

29. A secure software execution device as set forth in claim 1 wherein EMU circuitry maintains virtual-to-physical page mappings to allow the CPU to run software and/or operating systems that make use of virtual memory.

30. A secure software execution device as set forth in claim 1 wherein the EMU circuitry comprises one or more information storage tables for storing and maintaining information which provides one or more associations between encryption keys used for instructions and corresponding encryption keys used for data.

31. A secure software execution device as set forth in claim 1 wherein the EMU circuitry comprises one or more information storage tables for storing and maintaining information which provides one or more associations between one or more external storage memory pages and one or more encryption keys.

32. A secure software execution device as set forth in claim 1 wherein said off-chip source includes instructions and/or data encrypted in accordance with a symmetric block cipher.

33. A secure software execution device as set forth in claim 1 wherein said off-chip source includes instructions and/or data encrypted in accordance with a symmetric block cipher operating in counter mode.

34. A secure software execution device as set forth in claim 1 wherein said off-chip memory includes instructions and/or data encrypted in accordance with a plurality of symmetric block ciphers operating in different operating modes and wherein the EMU is operable to dynamically switch between appropriate encryption modes as needed to read or write instructions and/or data.

35. In a software execution device that includes a CPU having separate memory storage areas and physically separate information pathways for accessing instructions and data, encryption/decryption management circuitry capable of storing one or more encryption keys for encrypted instructions and one or more encryption keys for encrypted data, and key management circuitry, all instantiated on a single semiconductor chip, a method for providing a secure computing environment for protection of program instructions or data against unauthorized access and/or execution comprising:
obtaining one or more encryption/decryption keys to the key management circuitry from an off-chip source;
obtaining key credential information from one or more sources and providing the key credential information to the key management circuitry;
based on obtained key credential information, providing one or more encryption/decryption keys from the key management circuitry to the encryption/decryption management circuitry via an on-chip signal path that is inaccessible by the CPU;
obtaining encrypted instructions or data from an off-chip source and maintaining a record within the encryption/decryption management circuitry for indicating one or more associations between encryption keys used for instructions and encryption keys used for data accessed by the instructions; and
based on one or more encryption/decryption keys provided from the key management circuitry, decrypting said encrypted instructions or data and providing decrypted instructions or data to the CPU via said separate information pathways for data and instructions.

36. The method of claim 35 wherein at least some key credential information is obtained from a secure off-chip source via a secure connection.

37. The method of claim 35 wherein at least some key credential information is obtained from the CPU core.

38. The method of claim. 35 wherein at least some key credential information is obtained from an off-chip source which provides encrypted instructions and/or data.

39. The method of claim 35 wherein at least some credential information is an encryption/decryption key.

40. The method of claim 35 wherein a different encryption key is used for decrypting each single page of encrypted instructions or encrypted data provided from the off-chip source.

41. The method of claim 35 wherein encrypted instructions or data acquired from an off-chip source are encrypted in accordance with a symmetric block cipher.

42. The method of claim 35 wherein encrypted instructions or data acquired from an off-chip source are encrypted in accordance with a symmetric block cipher operating in counter mode.

43. The method of claim 35 further comprising maintaining virtual-to-physical page mappings within the encryption/decryption management circuitry which enable the CPU to run software and/or operating systems that make use of virtual memory.

44. The method of claim 35 wherein said off-chip memory includes instructions and/or data encrypted in accordance with a plurality of symmetric block ciphers operating in different operating modes and wherein the EMU is operable to dynamically switch between appropriate encryption modes as needed to read or write instructions and/or data.

45. A method for providing a secure computing environment for protection of program instructions or data against unauthorized access and/or execution, comprising:
providing a single semiconductor chip as a secure instruction execution device for decrypting and executing encrypted instructions, said chip at least having instantiated thereon: a CPU having access to separate storage areas for instructions and data and separate information pathways for instructions and data, encryption/decryption management circuitry including one or more table memory for storing one or more encryption keys and information indicative of one or more associations between encryption keys used for instructions and encryption keys used for data accessed by the instructions, and key management circuitry having a processor;
providing one or more encryption keys to the key management circuitry of said secure instruction execution device via a secure connection and providing said one or more encryption keys to the encryption/decryption management circuitry of said secure instruction execution device via an internal on-chip bus;
storing one or more encryption keys in said table memory;
receiving encryption key identifying credential information from one or more secure sources into the key management core of said secure instruction execution device and providing the key identifying credential information to the key management circuitry of the secure instruction execution device via an internal on-chip bus;
selecting one or more keys stored in said table memory for use in decrypting said encrypted instructions or encrypted data based on the obtained key credential information;
accepting encrypted instructions or encrypted data from an off-chip source and providing said encrypted instructions or encrypted data to the encryption/decryption management circuitry of said secure instruction execution device; and
decrypting said encrypted instructions or encrypted data based on one or more encryption keys and said information indicative of an association between encryption keys used for instructions and encryption keys used for data, and providing decrypted instructions or decrypted data to said CPU via an on-chip bus, wherein said decrypted instructions and decrypted data are provided to an L1 cache of the CPU via separate information pathways.

46. The method of claim 45 wherein credential information acquired from said one or more sources is combined and used to select one or more encryption keys stored in said table memory.

47. The method of claim 46 wherein said encrypted instructions or encrypted data are decrypted and provided as needed to an L1 cache of the CPU for execution by the CPU.

48. The method of claim 45 wherein encrypted instructions or encrypted data acquired from an off-chip source are encrypted in accordance with a symmetric block cipher.

49. The method of claim 45 wherein encrypted instructions or encrypted data acquired from an off-chip source are encrypted in accordance with a symmetric block cipher operating in counter mode.

50. The method of claim 45 further comprising maintaining virtual-to-physical page mappings within the encryption/decryption management circuitry which enable the CPU to run software and/or operating systems that make use of virtual memory.

51. The method of claim 45 wherein said off-chip memory includes instructions and/or data encrypted in accordance with a plurality of symmetric block ciphers operating in different operating modes and wherein the EMU is operable to dynamically switch between appropriate encryption modes as needed to read or write instructions and/or data.

52. A secure software execution device that provides a secure computing environment for protection of program instructions or data against unauthorized access and/or execution, comprising:
CPU core circuitry on a semiconductor chip, said CPU core circuitry having physically separate information pathways and storage areas for instructions and data;

encryption management circuitry instantiated on the chip, said encryption management circuitry having an instruction key table for storing encryption keys for encrypted instructions, a data key table for storing encryption keys for encrypted data, and an encryption/decryption engine for decrypting encrypted instructions and/or corresponding encrypted data based on one or more instruction encryption keys stored in the instruction key table and specifically associated data encryption keys stored in the data key table, the encryption management circuitry operable to maintain information indicative of one or more associations between one or more encryption keys used for instructions and one or more encryption keys used for corresponding data accessed by said instructions; and key management circuitry instantiated on the semiconductor chip, said key management circuitry comprising a processor for communicating with an off-chip key source and for providing encryption keys to the encryption management circuitry;

wherein encrypted information including executable instructions are acquired from an off-chip source, decrypted by the encryption management circuitry based on one or more encryption keys, and wherein the decrypted instructions and decrypted data are provided from the encryption management circuitry via the separate isolated pathways to the CPU core circuitry for execution.

53. A secure software execution device as set forth in claim 52, wherein the key management circuitry includes an on-chip memory for storing encryption keys.

54. A secure software execution device as set forth in claim 52, wherein the key management circuitry includes a secure key generation circuit instantiated on the semiconductor chip.

55. A secure software execution device as set forth in claim 52, wherein the semiconductor chip is a field programmable gate array (FPGA).

56. A secure software execution device as set forth in claim 52, wherein the semiconductor chip is an ASIC.

57. A secure software execution device as set forth in claim 52, wherein the device comprises a multi-chip module.

58. A secure software execution device as set forth in claim 52, wherein the device comprises a group of ASICs connected at the board level.

59. A secure software execution device as set forth in claim 52 wherein the encryption management circuitry maintains virtual-to-physical page mappings to allow the CPU to run software and/or operating systems that make use of virtual memory.

60. A secure software execution device as set forth in claim 52 wherein the encryption management circuitry comprises one or more information storage tables for storing and maintaining information which provides one or more associations between encryption keys used for instructions and corresponding encryption keys used for data.

61. A secure software execution device as set forth in claim 52 wherein the encryption management circuitry comprises one or more information storage tables for storing and maintaining information which provides one or more associations between one or more external storage memory pages and one or more encryption key.

62. A secure software execution device as set forth in claim 52 wherein said off-chip source includes instructions and/or data encrypted in accordance with a symmetric block cipher.

63. A secure software execution device as set forth in claim 52 wherein said off-chip source includes instructions and/or data encrypted in accordance with a symmetric block cipher operating in counter mode.

64. A secure software execution device as set forth in claim 52 wherein said off-chip memory includes instructions and/or data encrypted in accordance with aplurality of symmetric block ciphers operating in different operating modes and wherein the EMU is operable to dynamically switch between appropriate encryption modes as needed to read or write instructions and/or data.

* * * * *